No. 736,704. PATENTED AUG. 18, 1903.
E. & U. S. DE MOULIN.
INITIATING APPARATUS.
APPLICATION FILED FEB. 24, 1902.
NO MODEL. 2 SHEETS—SHEET 1.
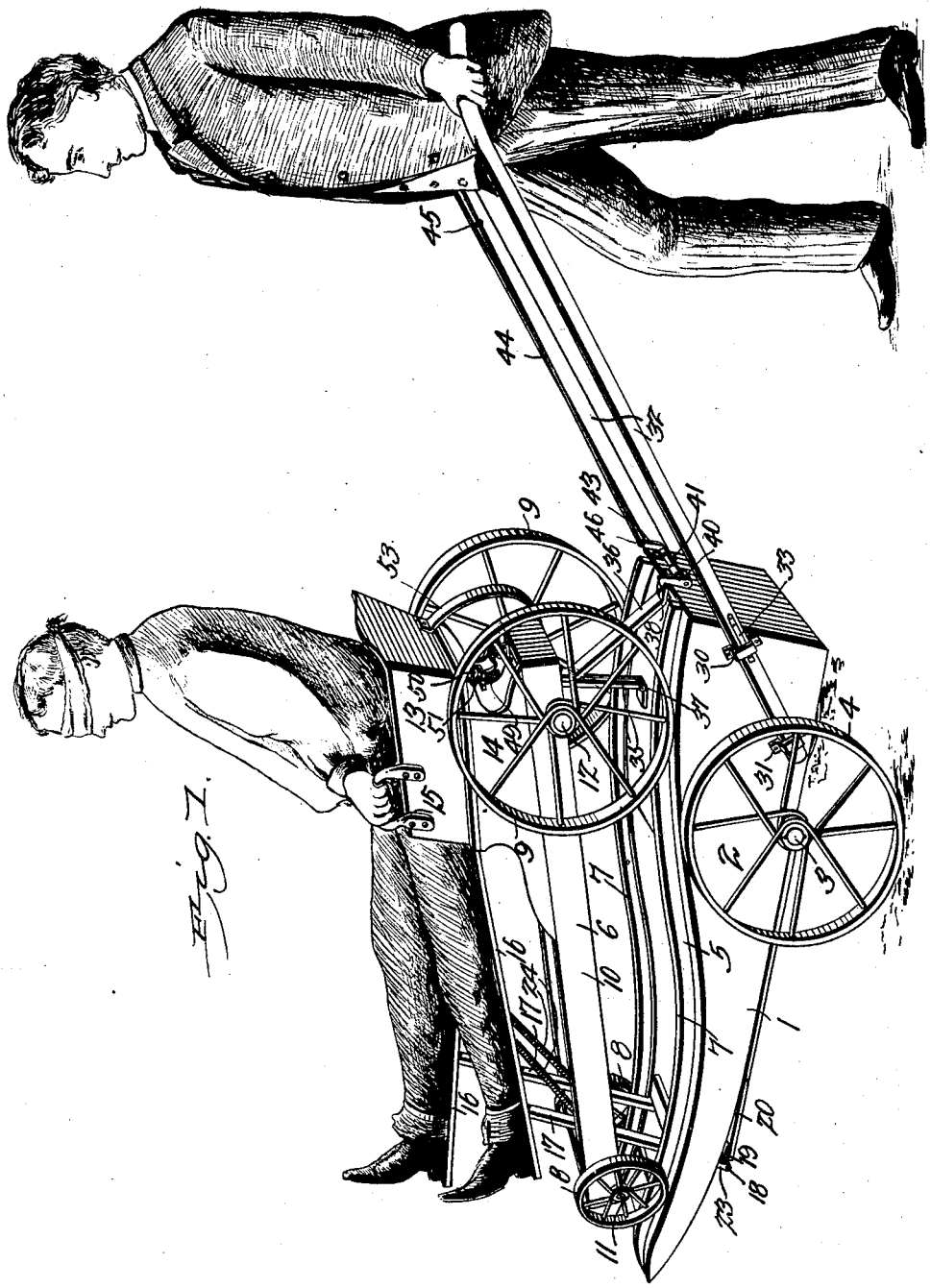

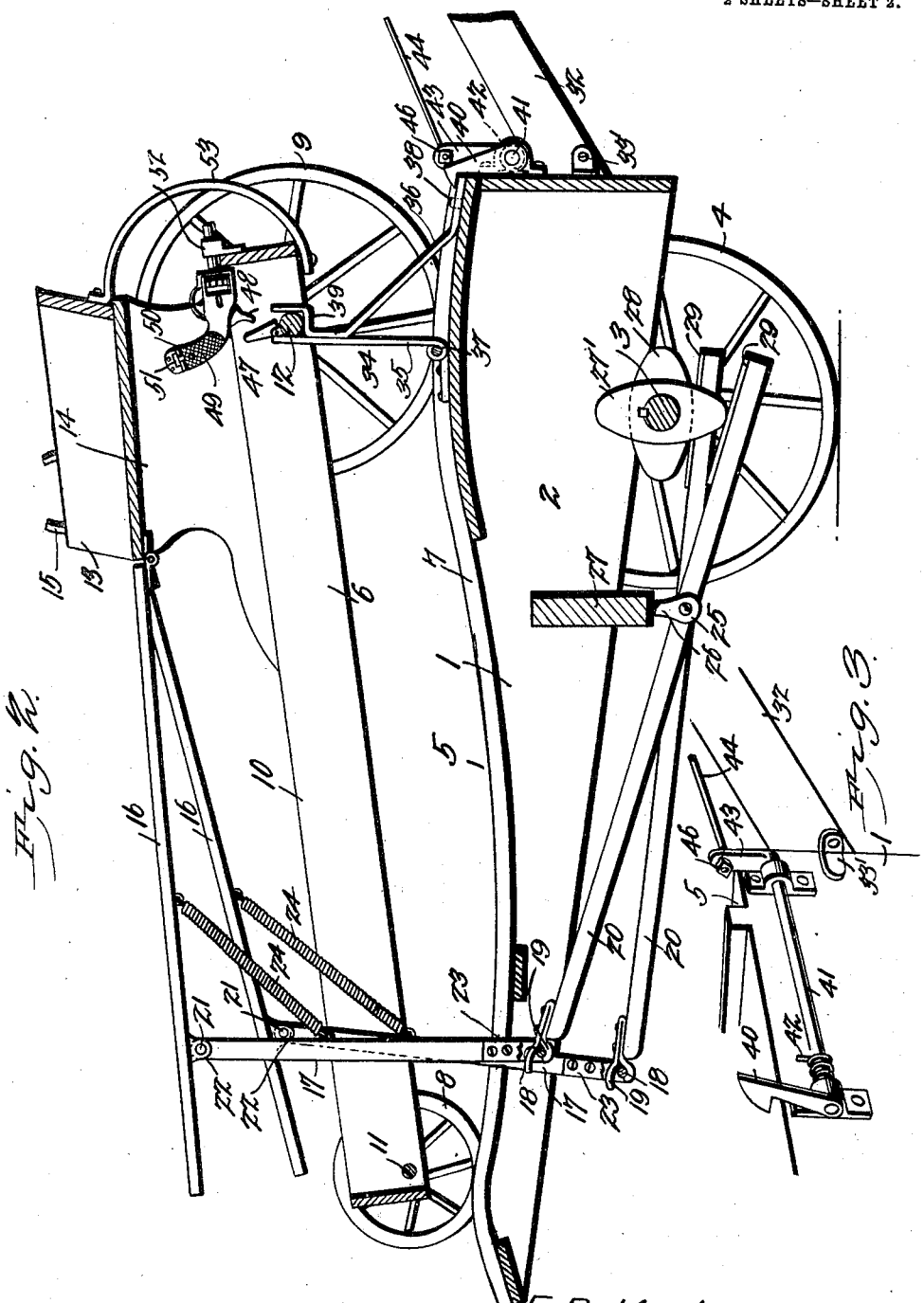

No. 736,704. Patented August 18, 1903.

UNITED STATES PATENT OFFICE.

EDMOND DE MOULIN AND ULYSSES S. DE MOULIN, OF GREENVILLE, ILLINOIS.

INITIATING APPARATUS.

SPECIFICATION forming part of Letters Patent No. 736,704, dated August 18, 1903.

Application filed February 24, 1902. Serial No. 95,433. (No model.)

*To all whom it may concern:*

Be it known that we, EDMOND DE MOULIN and ULYSSES S. DE MOULIN, citizens of the United States, residing at Greenville, in the county of Bond and State of Illinois, have invented a new and useful Initiating Apparatus, of which the following is a specification.

The invention relates to improvements in initiating apparatus.

The object of the present invention is to provide a simple and comparatively inexpensive initiating apparatus designed for use by lodges in initiating candidates and adapted to afford considerable amusement for the spectators and at the same time be perfectly harmless to the candidate.

A further object of the invention is to provide an apparatus of this character which will enable a candidate to be given the impression of riding a goat and which will be capable of changing the character of the motion and of deceiving the candidate as to the character of the motion to which he is subjected.

The invention consists in the construction and novel combination and arrangement of parts hereinafter fully described, illustrated in the accompanying drawings, and pointed out in the claims hereto appended.

In the drawings, Figure 1 is a perspective view of an apparatus constructed in accordance with this invention. Fig. 2 is a longitudinal sectional view of the same. Fig. 3 is a detail view of the locking mechanism for holding the vehicles together.

Like numerals of reference designate corresponding parts in all the figures of the drawings.

1 designates a lower two-wheeled vehicle provided with a body 2, having suitable bearings near its rear end for the reception of the shaft 3, upon which the wheels 4 are mounted, and one of the wheels is suitably fixed to the shaft, whereby the latter will be caused to rotate with such wheel. The body, which tapers toward its front end, is provided with suitable ways 5 for an upper vehicle 6, and when the front end of the lower vehicle rests upon the floor the body of the lower vehicle will present an upper inclined face and will cause the upper vehicle to roll downward and travel a considerable distance when the said upper vehicle is free to move. The upper face of the body is slightly curved, as shown, and the ways are preferably formed by rails or flanges 7, which are spaced from the side edges of the body and which prevent the wheels 8 and 9 of the upper vehicle from moving laterally on the body of the lower vehicle, so that there is no liability of the upper vehicle slipping therefrom.

The upper vehicle is provided with a suitable frame 10, and it has front and rear axles 11 and 12, the wheels of the front axle being much smaller than the wheels 9 of the rear axle, whereby when the upper vehicle is released, as hereinafter explained, it will assume an inclined position. Mounted upon the rear portion of the frame of the upper vehicle is a seat 13, provided with side pieces 14, which support the seat in an elevated position and which are mounted on the side bars of the frame 6. The seat, which is for the accommodation of the candidate, is provided at opposite sides with grips or handles 15, and hinged to the front edge of the bottom of the seat is a divided platform composed of sections 13, to which the legs of the candidate are strapped, as illustrated in Fig. 1 of the drawings.

The sections of the divided platform are given an alternate up-and-down motion when the lower vehicle is moved forward, and they are pivotally connected to the upper ends of automatically-foldable pitmen 17, which are provided at their lower ends with suitable pivots or pins 18, arranged in open bearings 19 of levers 20. The pitmen 17 consist of bars pivotally connected by pins 21 or other suitable fastening devices to ears 22, which depend from the sections of the platform, and the lower ends of the pitmen are provided with projecting side plates 23, which support the said pins 18. The open bearings 19, which may be constructed in any suitable manner, preferably consist of plates or strips folded, as clearly shown in Fig. 2, and having their terminals spread and curved, the upper terminals of the strips or plates being extended beyond the lower terminals. The pitmen are held in engagement with the open bearings of the levers 20 by coiled springs 24, extending upward and rearward from the pitmen to the sections of the divided platform and adapted when the upper vehicle rolls from the lower one to automatically fold the pitmen, which are swung upward clear of the floor as soon as they leave the open bearings of the levers.

The levers are fulcrumed between their ends by pivots 25, which are mounted in suitable brackets 26, depending from a transverse bar 27, and the rear arms of the levers are extended beneath the axle 3 of the lower vehicle and are arranged to be alternately engaged by cams 27' and 28, consisting of approximately elliptical plates arranged at right angles to each other and suitably keyed to the shaft 3 and forming double cams or eccentrics. The weight of the legs of the candidate upon the divided platform will hold the rear arms of the levers against the eccentric devices, and when the lower vehicle is pushed around the axle 3 will be rotated and a vertical reciprocatory motion will be communicated to the pitmen through the levers. The levers are designed to be provided at the upper edges of their rear arms with suitable wear-plates 29, arranged to be engaged by the eccentric devices to prevent the levers from becoming worn. By means of the levers, the eccentric devices, and the pitmen the legs of the candidate will be given a quick alternate up-and-down motion, and after a sufficient amount of this exercise has been given to the candidate the upper vehicle is released, as hereinafter explained, and caused to roll down the inclined upper face of the lower vehicle.

The lower vehicle is provided at opposite sides of its body with loops 30 and 31, arranged to receive inclined handles 32, which are secured in the loops by catches 33 and which are held against downward movement in the loops by suitable stops 33', consisting of L-shaped plates or knees secured to the inner faces of the handles and engaging the rear end of the body of the lower vehicle. The catches, which are depressible and which may be of any desired construction, engage the upper loops 30 at the front edges thereof.

The upper vehicle is held on the lower vehicle by arranging the rear axle 12 within a hinged support or bracket 34, consisting of an upright front side or member 35 and an inclined rear member or brace 36. The upright bar or member is connected at its lower end with the body of the lower vehicle by a suitable hinge 37, and the inclined brace, which has its lower rear end perforated to receive a projection or stud 38, is provided at its upper end with an L-shaped arm or extension 39, offset from the upper end of the front bar or member and forming a recess for the reception of the rear axle. The bracket or support is held in engagement with the stud or projection 38 by a catch or dog 40, and when released the weight of the upper vehicle is adapted to swing the rear brace or arm upward out of engagement with the stud or projection, thereby releasing the upper vehicle and permitting the same to roll down the inclined upper face of the body of the lower vehicle. When this is effected, the oscillation of the hinged sections of the divided platform will cease and the seat and the sections will assume an inclined position and the candidate will experience the sensation of sliding down a continuous incline, while the upper vehicle is rolling over the floor through the impetus imparted to it by the forward movement of the lower vehicle and by the inclination of the same.

The dog or catch is mounted on a short shaft 41 and is normally held in engagement with the rear end of the side or brace 36 by a coiled spring 42, disposed on the shaft and engaging the same and the body of the lower vehicle, or one end of the spring may be connected with one of the bearings of the shaft. The shaft 41 is provided at its outer end with an arm 43, to which is connected an operating-rod 44, extending rearward from the body and arranged in a guide 45 of one of the handles. The front end of the operating-rod is detachably secured to the arm 43 by a nut 46, which enables the parts to be readily disconnected, so that the apparatus may be compactly stored away when not in use.

The rear axle of the upper vehicle is fixed to one of the hind wheels and is provided with a pivoted finger 47, arranged to engage the hammer 48 of an inverted revolver 49, arranged as illustrated in Fig. 2 of the accompanying drawings and having its trigger mechanism removed, so that when the hammer is drawn back by the operation of the finger and is released it will be thrown forward by the main spring of the revolver and caused to explode a cartridge. The finger is pivoted near its front edge, and when the rear axle rotates forwardly the inner end or heel of the finger will rest against the rear axle when the said finger ascends, and it will be held perfectly rigid with the axle when engaging the hammer to operate and discharge the revolver. Should, however, the axle rotate rearwardly, the finger will swing out of the way and not injure the revolver. As the upper vehicle moves forward, the revolver will be rapidly discharged. The revolver is secured to one side of the upper vehicle by a suitable bracket 50, consisting of an L-shaped plate mounted on the inner face of one of the side pieces 14 and having one of its arms or portions slotted to receive a clamping-screw 51. The revolver is inverted and is pointed rearwardly, its barrel being arranged within an opening of a plate or bracket 52, as clearly shown in Fig. 2. A curved guard 53 is located directly in rear of the revolver to prevent the powder or wad from burning or otherwise injuring any one standing in close proximity to the back of the upper vehicle while the revolver is being discharged. The curved guard is secured at its upper end to the seat at the back thereof, and its lower end is mounted on the frame of the upper vehicle, being preferably secured to the same at the lower edge thereof.

It will be seen that the apparatus is exceedingly simple and inexpensive in construction and that while it is adapted to afford a great amount of amusement it is absolutely harmless and cannot result in injury to either a candidate or the spectators.

What we claim is—

1. An initiating apparatus comprising a manually-propelled lower vehicle having a track or way arranged longitudinally of the direction of movement of the lower vehicle, and an upper vehicle detachably held on the track or way of the lower vehicle, substantially as described.

2. An initiating apparatus comprising a manually-propelled lower vehicle, an upper vehicle detachably held on the lower vehicle and arranged longitudinally of the direction of movement of the same, and means for tripping or releasing the upper vehicle, whereby the upper vehicle is adapted to be projected from the lower vehicle, substantially as described.

3. An initiating apparatus comprising a manually-propelled lower two-wheeled vehicle having a tilting body and provided with a track or way arranged longitudinally of the direction of movement of the vehicle and adapted to be placed in an inclined position by the tilting of the body, an upper vehicle detachably mounted on the body of the lower vehicle, and means for tripping or releasing the upper vehicle, substantially as described.

4. An apparatus of the class described comprising a lower two-wheeled vehicle having a tapering body provided at its upper face with an inclined track or way, handles extending rearward from the body, an upper vehicle detachably held on the body of the lower vehicle, and operating mechanism mounted on one of the handles for releasing the upper vehicle, substantially as described.

5. An apparatus of the class described comprising a lower vehicle, an upper vehicle mounted on the lower vehicle and adapted to be projected therefrom, firing mechanism and means for operating the firing mechanism when the upper vehicle moves forward, substantially as described.

6. An initiating apparatus comprising a manually-propelled vehicle, an independently-movable vehicle carried by the same, and means for detachably holding the latter vehicle on the former, said means permitting the independently-movable vehicle to be projected from the manually-propelled vehicle when the same is suddenly stopped, substantially as described.

7. An apparatus of the class described comprising a lower vehicle, an upper vehicle arranged upon and adapted to be projected from the lower vehicle, a hinged bracket or support mounted on the lower vehicle and receiving the upper vehicle, means for locking the bracket or support rigid with the lower vehicle, and operating mechanism for releasing the bracket or support, substantially as described.

8. An apparatus of the class described comprising a lower vehicle, an upper vehicle mounted on the lower vehicle, an upright bracket provided at the top with a recess to receive a portion of the upper vehicle, and having front and rear sides, the front side being hinged to the lower vehicle, and the rear side being detachably engaged with the same, a shaft having a dog or catch for holding the rear side of the bracket in engagement with the vehicle, and operating mechanism for partially rotating the shaft to release the bracket, substantially as described.

9. An apparatus of the class described comprising a lower vehicle having two wheels and provided with removable handles extending rearward from the vehicle, an upper four-wheeled vehicle arranged on the lower vehicle, a hinged bracket mounted on the lower vehicle and engaging one of the axles of the upper vehicle, locking mechanism mounted on the lower vehicle and engaging the bracket, and operating mechanism arranged on one of the handles and connected with the locking mechanism, substantially as described.

10. An apparatus of the class described having two independent vehicles, one being adapted to be projected from the other, said projected vehicle being provided with a revolving axle, a revolver mounted on the projected vehicle adjacent to the said axle, and means carried by the axle for engaging the hammer of the revolver, whereby the latter will be fired, substantially as and for the purpose described.

11. An apparatus of the class described comprising upper and lower vehicles, the upper vehicle being adapted to be projected from the lower vehicle and having a revolving axle, a revolver mounted on the upper vehicle with its hammer arranged adjacent to the said axle, and a finger pivotally mounted on the axle and carried by the same and arranged to engage and operate the hammer of the revolver when the upper vehicle moves forward and adapted to be swung back by the revolver when the axle rotates rearwardly, substantially as and for the purpose described.

12. An apparatus of the class described comprising a vehicle having a rotating axle, a revolver mounted on the vehicle, means carried by the axle for firing the revolver, and a guard or shield arranged in front of the barrel of the revolver, substantially as described.

13. An apparatus of the class described comprising a wheeled vehicle having a rotating axle having a projection, and a revolver mounted on the vehicle and having its hammer arranged in the path of the projection, whereby the revolver will be discharged when the vehicle moves forward, substantially as described.

14. An apparatus of the class described comprising upper and lower vehicles, the upper vehicle being adapted to be projected from the lower vehicle and being provided with a divided platform to receive the legs of a person, and means for communicating motion from the lower vehicle to the divided platform while the upper vehicle is being carried by the said lower vehicle, substantially as described.

15. An apparatus of the class described comprising upper and lower vehicles, the upper vehicle being adapted to be projected from the lower vehicle and having a divided platform and means for reversely oscillating the sections of the platform while the upper vehicle is carried by the lower vehicle, substantially as described.

16. An apparatus of the class described comprising two independent vehicles, one of the vehicles being adapted to be projected from the other and provided with a divided platform for the reception of the legs of a person, and means for oscillating the sections of the platform while the vehicles are together, substantially as described.

17. An apparatus of the class described comprising two independent vehicles one being carried by the other and adapted to be projected from the same and provided with a divided platform for the accommodation of the legs of the occupant, and means for reversely oscillating the sections of the divided platform, substantially as described.

18. An apparatus of the class described comprising upper and lower vehicles, the upper vehicle being arranged to be projected from the lower one and provided with a divided platform, levers fulcrumed on the lower vehicle, pitmen for communicating motion from the levers to the sections of the divided platform, and means carried by the lower vehicle for reversely oscillating the levers, substantially as described.

19. An apparatus of the class described comprising upper and lower vehicles, the upper vehicle being adapted to be projected from the lower vehicle and provided with a divided platform, levers carried by the lower vehicle, pitmen connecting the sections of the platform with the levers and being detachable from the latter, and means for folding the pitmen, substantially as described.

20. An apparatus of the class described comprising upper and lower vehicles, the upper vehicle being adapted to be projected from the lower one and provided with a divided platform, pitmen hinged to the sections of the platform, levers carried by the lower vehicle and detachably receiving the pitmen, springs connected with the pitmen and holding the same in engagement with the levers and adapted to fold the pitmen automatically when the upper vehicle leaves the lower one, and means for operating the levers, substantially as described.

21. An apparatus of the class described comprising upper and lower vehicles, the upper vehicle being adapted to be projected from the lower one and having a divided platform, levers mounted on the lower vehicle, pitmen connecting the levers with the sections of the platform, and cams carried by the lower vehicle and reversely oscillating the levers, substantially as described.

22. An apparatus of the class described comprising a lower vehicle having a revolving axle, an upper vehicle provided with a divided platform, levers fulcrumed between their ends on the lower vehicle, the approximately elliptical cams arranged at right angles to each other and mounted on the axle of the lower vehicle and engaging the levers, and pitmen connecting the levers with the sections of the platform, substantially as described.

23. An apparatus of the class described comprising the lower two-wheeled vehicle having a body, an upper four-wheeled vehicle provided with a frame and having a seat arranged above the frame, a divided platform composed of sections hinged to the seat, and means for supporting the sections of the platform at an elevated position and for oscillating them while the vehicles are together, substantially as described.

In testimony that we claim the foregoing as our own we have hereto affixed our signatures in the presence of two witnesses.

EDMOND DE MOULIN.
ULYSSES S. DE MOULIN.

Witnesses:
R. S. DENNY,
H. C. DIEHL.